(12) United States Patent
Branch (10) Patent No.: US 6,618,779 B1
(45) Date of Patent: Sep. 9, 2003

(54) METHOD AND APPARATUS FOR CHAINING INTERRUPT SERVICE ROUTINES

(75) Inventor: Robert A. Branch, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/580,116

(22) Filed: May 30, 2000

(51) Int. Cl.[7] .............................................. G06F 13/24
(52) U.S. Cl. ...................................... 710/261; 710/266
(58) Field of Search ................................. 710/260–269

(56) References Cited

U.S. PATENT DOCUMENTS

| | | | |
|---|---|---|---|
| 4,768,149 A | 8/1988 | Konopik et al. ............. 364/200 |
| 5,175,828 A | 12/1992 | Hall et al. ................... 395/375 |
| 5,555,395 A * | 9/1996 | Parks .......................... 711/145 |
| 5,596,735 A * | 1/1997 | Hervin et al. ............... 712/239 |
| 5,603,014 A * | 2/1997 | Woodring et al. ............ 703/22 |
| 5,642,491 A * | 6/1997 | Rose et al. .................... 711/2 |
| 5,701,493 A * | 12/1997 | Jaggar ......................... 710/261 |
| 5,978,882 A | 11/1999 | Adams ........................... 711/2 |

FOREIGN PATENT DOCUMENTS

WO    WO98/33106    7/1998

* cited by examiner

*Primary Examiner*—Rupal Dharia
(74) *Attorney, Agent, or Firm*—Crystal D. Sayles (57) ABSTRACT

A method of chaining interrupt service routines comprises creating a chain handler module and replacing an instruction in an existing interrupt service routine with a branch directed to the chain handler module.

25 Claims, 6 Drawing Sheets

Computer 600

Interrupt Vector Table 100

| Entry | Bundle |
|---|---|
| Entry 101 | Bundle 111 |
| | Bundle 112 |
| | Bundle 113 |
| | Bundle 114 |
| | Bundle 115 |
| | Bundle 116 |
| | Bundle 117 |
| | Bundle 118 |
| Entry 102 | Bundle 119 |
| | Bundle 120 |
| | Bundle 121 |
| | Bundle 122 |
| | Bundle 123 |
| | Bundle 124 |
| | Bundle 125 |
| | Bundle 126 |
| Entry 103 | Bundle 127 |
| | Bundle 128 |
| | Bundle 129 |
| | Bundle 130 |
| Entry 104 | Bundle 131 |
| | Bundle 132 |
| | Bundle 133 |
| | Bundle 134 |
| Entry 105 | Bundle 135 |
| | Bundle 136 |
| | Bundle 137 |
| | Bundle 138 |
| Entry 106 | Bundle 139 |
| | Bundle 140 |
| | Bundle 141 |
| | Bundle 142 |

METHOD AND APPARATUS FOR CHAINING INTERRUPT SERVICE ROUTINES

FIELD OF THE INVENTION

Embodiments of the present invention provide a method and apparatus for chaining interrupt service routines. In particular, the present invention provides a method and apparatus for chaining interrupt service routines in systems where the interrupt vector table contains interrupt service routine instructions.

BACKGROUND OF THE INVENTION

An interrupt service routine (ISR) is a routine that is executed by a microprocessor when a specific interrupt occurs. For example, a timer interrupt may occur at a given interval and may cause the execution of an interrupt service routine that updates the system clock. In most computer systems, the occurrence of an interrupt causes program flow to be routed through an interrupt vector table (IVT), which is a table that determines which interrupt service routines are executed when interrupts occur. Different interrupts may cause control to be passed to different points in the interrupt vector table. The interrupt vector table in some systems contains pointers to interrupt service routines, while in other systems the interrupt vector table contains interrupt service routine instructions. In addition, the interrupt vector table in some systems is placed in a known location in physical memory, while in other systems the interrupt vector table is not at a fixed address. Further, in some systems the size of the interrupt vector table is fixed, for example at 32 kilobytes (KB).

At times, it may become necessary to combine a new interrupt service routine with an existing interrupt service routine so that the new interrupt service routine performs an operation immediately before or after the existing interrupt service routine. For example, a new device driver may be added requiring execution of a new interrupt service routine to poll a certain hardware device each time an existing interrupt service routine updates the system clock. The interrupt service routines may be combined by modifying the call to the existing interrupt service routine, so that the new interrupt service routine is called instead of the existing interrupt service routine, and by having the new interrupt service routine jump to the existing interrupt service routine upon completion. The combination of two interrupt service routines is referred to as "chaining" of interrupt service routines.

In systems where the interrupt vector table is at a fixed location and contains pointers to interrupt service routines, chaining a new interrupt service routine with an existing interrupt service routine involves updating the appropriate pointer in the interrupt vector table so that it points to the new interrupt service routine, and including an instruction at the end of the new interrupt service routine that causes program flow to jump to the address of the existing interrupt service routine. Replacement of pointers cannot be used in systems for which the interrupt vector table does not contain pointers, but instead contains actual code for the interrupt service routines. In such a system, it may be difficult to store the new interrupt service routine if the system has a fixed interrupt vector table size and does not have many available empty locations in the interrupt vector table. If a system also limits the distance of Instruction Pointer (IP) relative branches, it may also be difficult to store the new interrupt service routine outside the interrupt vector table.

DETAILED DESCRIPTION OF THE INVENTION

The present invention provides a method and apparatus for chaining interrupt service routines in systems where the interrupt vector table contains interrupt service routine instructions. The present invention provides a mechanism that permits the new interrupt service routine to reside outside of the interrupt vector table even where the reach of IP relative branches is limited.

Figure 1:
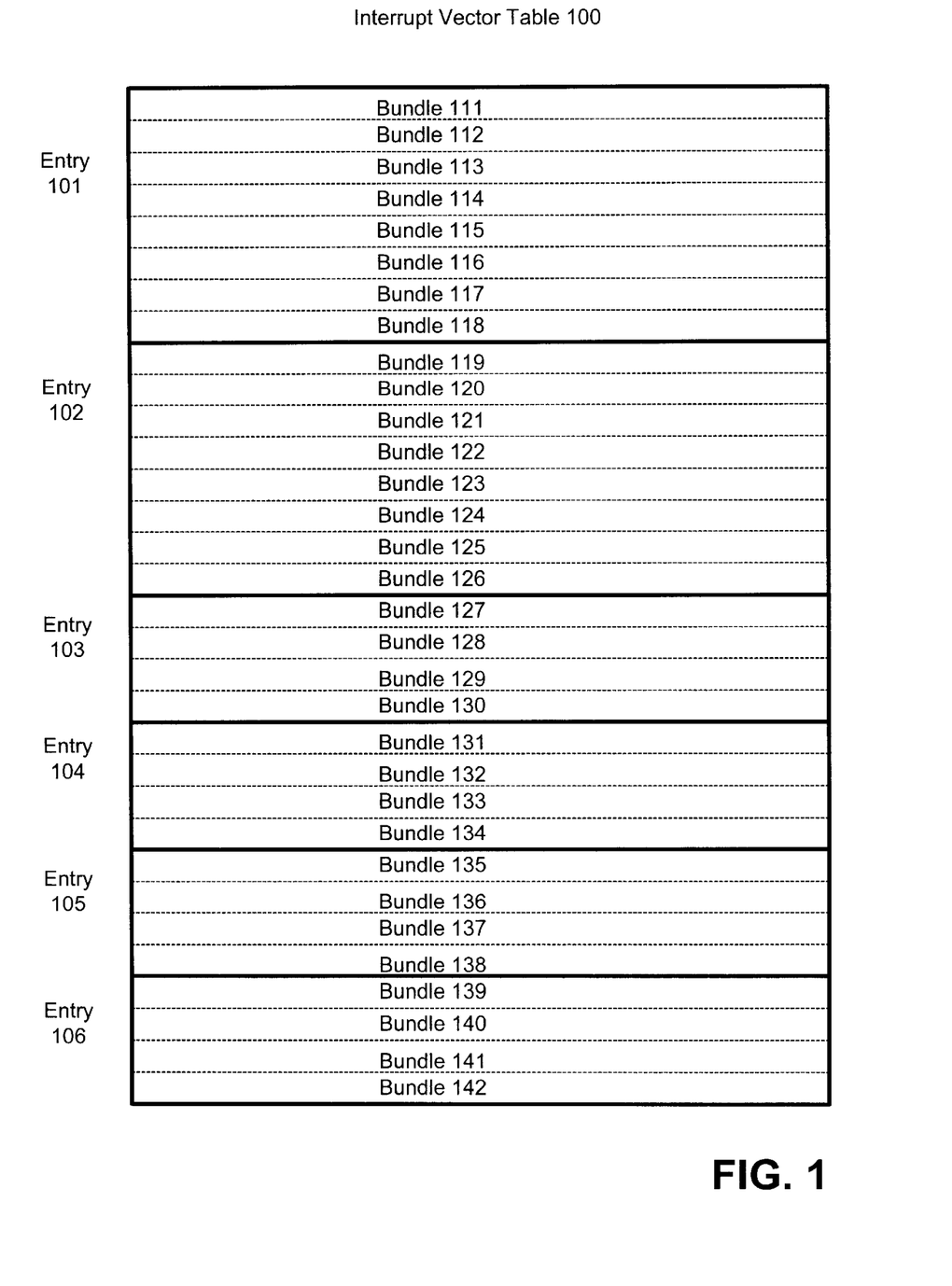
FIG. 1 is a partial block diagram of an interrupt vector table which may contain chained interrupt service routines according to one embodiment of the present invention.

FIG. 1 is partial block diagram of an interrupt vector table which may contain chained interrupt service routines according to one embodiment of the present invention. Interrupt vector table 100 shown in FIG. 1 contains six entries which are labeled entry 101 to entry 106. Entries 101 and 102 each provide eight instruction bundles per entry, and entries 103 to 106 provide four instruction bundles per entry. An instruction bundle (also referred to as a "bundle") is a series of instructions that may be issued to the microprocessor together. In one embodiment, an instruction bundle has the capacity to contain up to three assembly instructions, but may contain less then three instructions. For example, in this embodiment an instruction bundle may have the capacity to contain three instructions but may only contain one instruction. In another embodiment, each instruction bundle only has the capacity to contain one assembly instruction, in which case the designation "instruction bundle" is interchangeable with the designation "instruction." That is, in this embodiment, instead of instruction bundles (e.g., bundles 111 to 142), the interrupt vector table contains individual instructions.

In FIG. 1, entry 101 is shown containing instruction bundles 111 to 118, entry 102 is shown containing instruction bundles 119 to 126, and entries 103 to 106 are shown containing, respectively, four instruction bundles each of 127 to 142. The present invention may be used with an interrupt vector table that has any number of entries and for which the entries may contain any number of bundles. For example, an embodiment of the present invention may be used with an interrupt vector table that has 68 entries, 20 of which provide 64 bundles per entry and 48 of which provide 16 bundles per entry. The present invention may also be used with an interrupt vector table for which all the entries in the interrupt vector table are of the same size.

Each entry in the interrupt vector table 100 may contain the instructions for an interrupt service routine. For example, entry 101 in interrupt vector table 100 may contain the instructions for an interrupt service routine that is called to update the system clock at a periodic interval. Thus, bundle 111 may contain the first three instructions of the interrupt service routine that updates the system clock, bundle 112 may contain the second three instructions of this interrupt service routine, ext. An interrupt service routine may fill part or all of an entry in an interrupt vector table 100. For example, an interrupt service routine stored in entry 101 may use six out of the eight bundles provided in that entry. In this example, bundles 117 and 118 are not used and may contain, for example, a "no operation" (NOOP) designation (not shown).

In one embodiment, interrupt vector table 100 is not at a fixed address. In such an embodiment, the base address of the interrupt vector table 100 may be contained in a control register located within the microprocessor. In another embodiment, interrupt vector table 100 has a fixed size of 32 kilobytes (KB).

Figure 2:
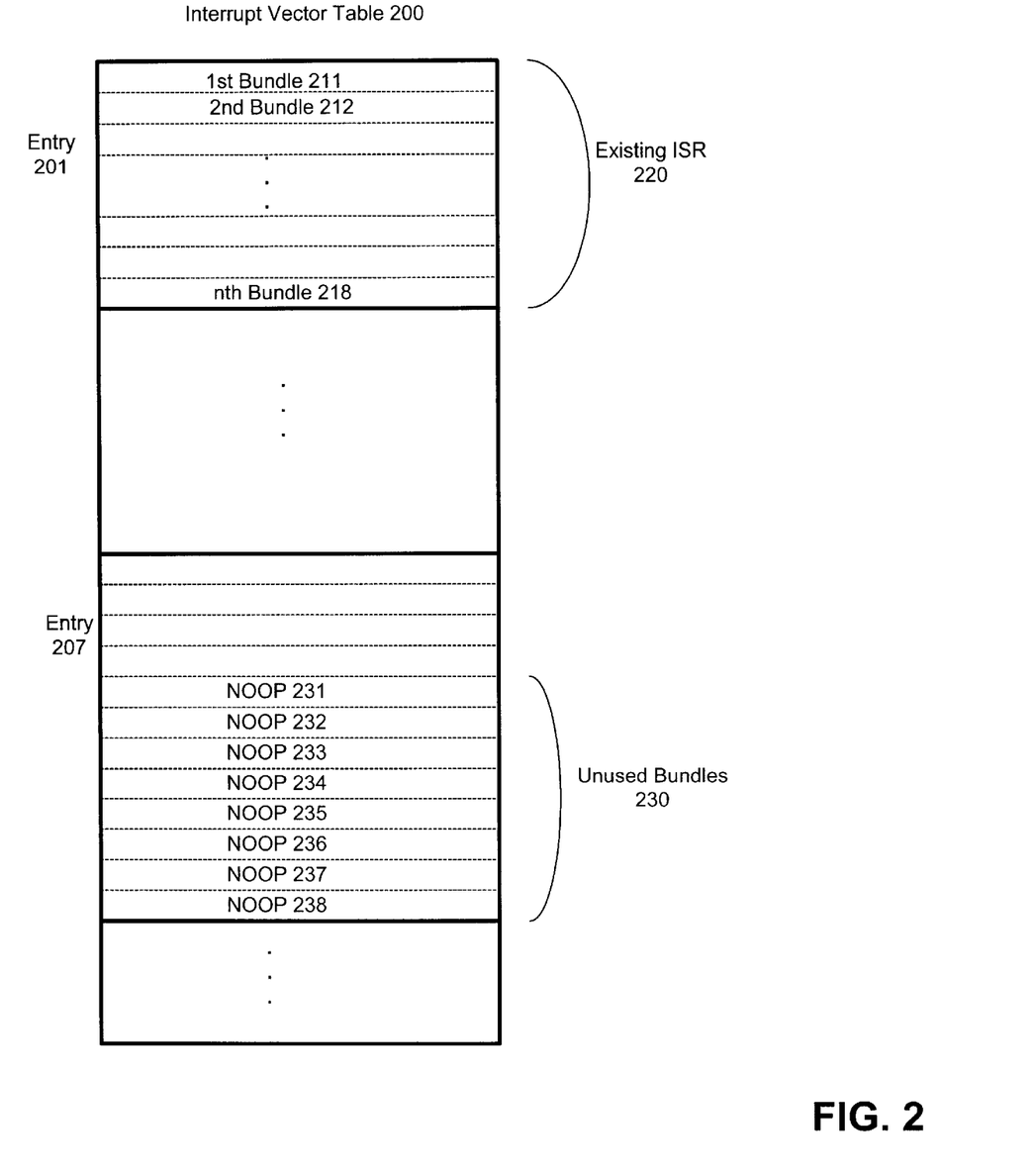
FIG. 2 is a partial block diagram of an interrupt vector table which contains an interrupt service routine that may be chained according to an embodiment of the present invention.

FIG. 2 is a partial block diagram of an interrupt vector table which contains an interrupt service routine that may be chained according to an embodiment of the present invention. FIG. 2 shows an interrupt vector table 200 that has an entry 201 and an entry 207. Interrupt vector table 200 may also contain other entries that are not shown in FIG. 2. Interrupt vector table 200 may be the same as interrupt vector table 100 of FIG. 1, and entry 201 may be the same as entry 101 in FIG. 1. Entry 201 contains n instructions bundles, which includes a $1^{st}$ bundle 211, a $2^{nd}$ bundle 212, and an $n^{th}$ bundle 218. As shown in FIG. 2, the bundles in entry 201 are the instructions for an existing interrupt service routine 220. As used herein, an interrupt service routine is said to be "existing" if it is pointed to or contained in the interrupt vector table, and thus is available to service an interrupt. By contrast, an interrupt service routine that is being chained to an existing interrupt service routine is referred to as "new." Such interrupt services routines are "new" in the sense that they are being newly chained to the existing interrupt service routine. In some cases, an interrupt is "new" for the purposes of the present invention even though it may have been present in system memory and available to the system prior to chaining.

Interrupt service routine 220 may be, for example, the interrupt service routine that is called to update the system clock on a periodic basis. As shown in FIG. 2, instruction bundle 211, 212 and 218 are bundles of instructions that are part of existing interrupt service routine 220. As discussed above, an instruction bundle may have the capacity to contain more than one instruction, and a bundle may contain less than its capacity. In the example shown, existing interrupt service routine 220 contains n instruction bundles, and the nth bundle in existing interrupt service routine 220 may be instruction bundle 218. Thus, instruction bundle 211 may contain the first three instructions in existing interrupt service routine 220 (which may be the first three instructions in the interrupt service routine that is called to update the system clock on a periodic basis) and bundle 218 may contain the last instruction in existing interrupt service routine 220.

Entry 207 in interrupt vector table 200 contains unused bundles 230, which consists of bundles 231 to 238. Unused bundles are bundles in an interrupt vector table that do not contain instructions for an interrupt service routine. In one embodiment, shown in FIG. 2, unused bundles 231 to 238 contain a "no operation" (NOOP) designation. In one embodiment, an entry in the interrupt vector table that contains an interrupt service routine may also contain unused bundles. That is, in this embodiment an interrupt service routine may only use part of an interrupt vector table entry.

Figure 3:
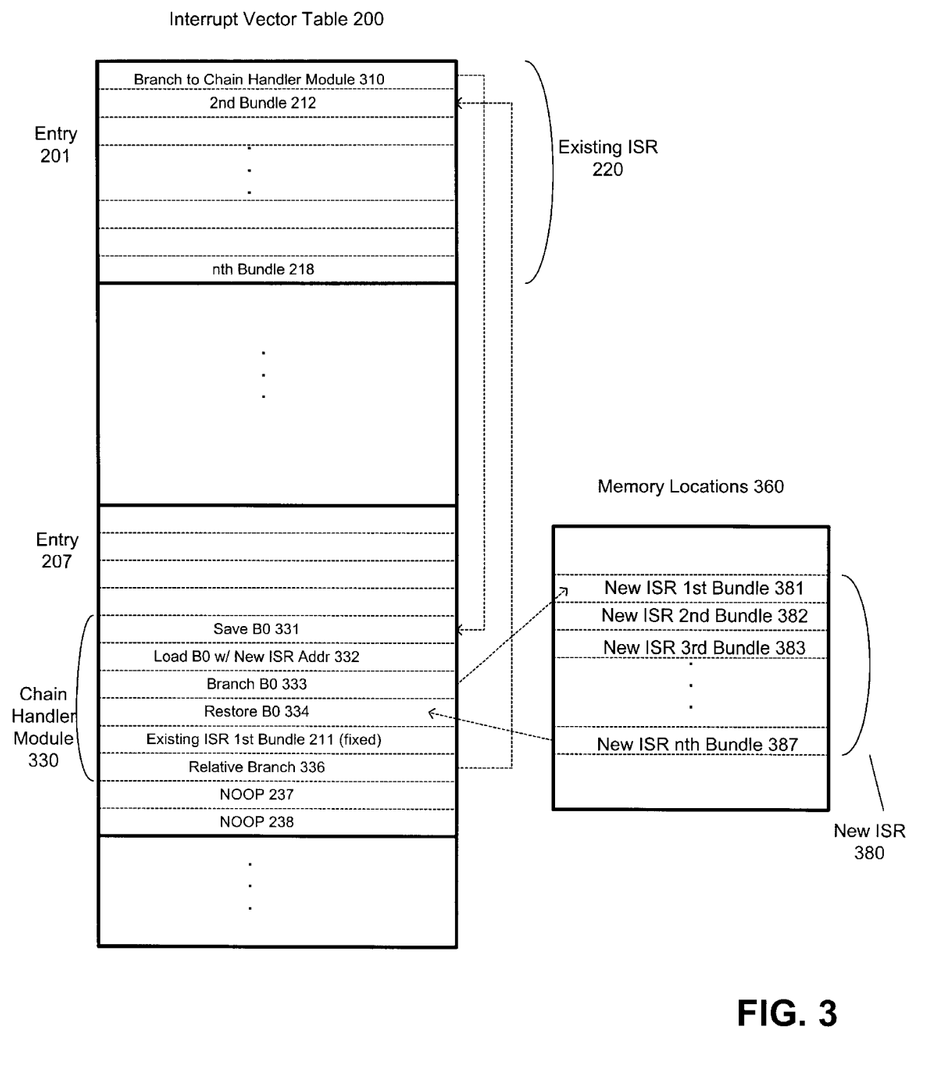
FIG. 3 is a partial block diagram of an interrupt vector table in which a new interrupt service routine has been chained to an existing interrupt service routine according to an embodiment of the present invention.

FIG. 3 is partial block diagram of an interrupt vector table in which a new interrupt service routine has been chained to an existing interrupt service routine according to an embodiment of the present invention. For convenience, FIG. 3 shows interrupt vector table 200 that is the same as the interrupt vector table 200 shown in FIG. 2, although some of the entries have been modified as discussed below. The present invention may be used with interrupt vector tables having configurations other than that shown in FIG. 2 and FIG. 3, and may be used to chain to existing interrupt service routines other than those shown in FIG. 2 and FIG. 3.

FIG. 3 shows entry 207 in interrupt vector table 200 which, for convenience, contains the same entry 207 as shown in FIG. 2. However, locations that in FIG. 2 were occupied by unused bundles 230 are, in FIG. 3, now occupied by bundles in chain handler module 330. Chain handler module 330 will be further described below. Also for convenience, FIG. 3 shows that interrupt vector table 200 contains the same entry 201 as shown in FIG. 2. As in FIG. 2, existing interrupt service routine 220 in FIG. 3 contains n instruction bundles, including $2^{nd}$ bundle 212 and $n^{th}$ bundle 218. However, where in FIG. 2 the first instruction in interrupt service routine 220 was $1^{st}$ bundle 211, in FIG. 3 this bundle has been replaced by a Branch to Chain Handler Module instruction 310. The Branch to Chain Handler Module instruction 310 may be an instruction pointer relative branch instruction that causes program flow to branch to the first instruction in chain handler module 330. In one embodiment, an instruction pointer relative branch instruction does not use a branch register to perform the branch. In FIG. 3, the arrows indicate program flow.

FIG. 3 also shows a group of memory locations 360 that contains a new interrupt service routine 380. Memory locations 360 maybe in a part of system memory other than the locations occupied by the interrupt vector table. New interrupt service routine 380 is an interrupt service routine that is being chained to existing interrupt service routine 220. For example, a new device driver may have been added that requires the execution of a new interrupt service routine to poll a certain hardware device each time an existing interrupt service routine updates the system clock, and new interrupt service routine 380 may contain instructions to poll the hardware device. The hardware device may be, for example, a serial port that may be polled for incoming data. New interrupt service routine 380 may contain any number of instruction bundles. In the embodiment shown in FIG. 3, new interrupt service routine 380 contains n instruction bundles which include a new interrupt service routine $1^{st}$ bundle 381, a new interrupt service routine $2^{nd}$ bundle 382, a new interrupt service routine $3^{rd}$ bundle 383, and a new interrupt service routine $n^{th}$ bundle 387. Using the example discussed above, new interrupt service routine $1^{st}$ bundle 381 may contain the first instructions for an interrupt service routine that polls a certain hardware device. As discussed above, an instruction bundle may have the capacity to contain more than one instruction, and a bundle may contain less than its capacity. In the embodiment shown in FIG. 3, new interrupt service routine 380 occupies part of memory locations 360.

Chain handler module 330 may be a module of assembly instructions that have been written into some of the unused bundles 230 in interrupt vector table 200 in order to chain a new interrupt service routine with an existing interrupt service routine. As shown in FIG. 3, chain handler module 330 may not occupy all of the unused bundles 230.

The first instruction bundle in chain handler module 330 may be a Save B0 instruction 331. In this embodiment, B0 may be a branch register that may contain an address that must be preserved during execution of the interrupt service routines. Upon execution, the instruction 331 may save branch register B0 in a temporary memory location. In other embodiments, the branch register may be referred to by other designations (e.g., "BR1") and a "branch" operation may be referred to using other designations (e.g., Jump). The second instruction bundle in chain handler module 330 may be an instruction to Load B0 with New Interrupt Service Routine Address 332. Upon execution, this instruction may load branch register B0 with the start address of new interrupt service routine 380. The third instruction bundle in chain handler module 330 may be a Branch B0 instruction 333. Upon execution, this instruction may cause control flow to branch to the address specified in location B0, which may be the start address of new interrupt service routine 380. Thus, this instruction may call new interrupt service routine 380.

The fourth instruction bundle in chain handler module 330 may be a Restore B0 instruction 334. This instruction may copy the value saved earlier from a temporary memory location into branch register B0, thus restoring B0 to the value it had when the chain handler module was called. The fifth instruction bundle in chain handler module 330 may be the existing interrupt service routine First Bundle 211, which is a copy of the First Bundle 211 shown as part of existing interrupt service routine 220 in FIG. 2. As discussed above, and as shown in FIG. 3, this bundle has been replaced in existing interrupt service routine 220 by Branch to Chain Handler Module instruction 310. The First Bundle 211 in chain handler module 330 may not be an exact copy of the First Bundle 211 shown in FIG. 2 because in chain handler module 330 any instruction pointer (IP) relative operations in First Bundle 211 may have been "fixed up." That is, First Bundle 211 may have contained an IP relative operation such as "branch IP+2," which would cause the program flow to branch to the instruction that is two locations away from the IP relative instruction. Once First Bundle 211 is moved from entry 201 to entry 207, the instruction that was two locations away from the IP relative instruction may now be a different distance away from the IP relative instruction. An IP relative instruction is "fixed up" or "fixed" by changing the relative location branched to. For example, a "Branch IP+2" instruction might become a "Branch IP–30" instruction. Finally, the last instruction bundle in chain handler module 330 may be a Relative branch instruction 336, which may cause program flow to branch to the second bundle in existing interrupt service routine 220.

One embodiment of a code segment for chain handler module 330 is shown below. Other embodiments may use different code segments. For example, a different programming language may be used, or the instructions may be in a different sequence. The code segment below uses an assembly language. In the code segment below, ";;" designates a bundler separator.

```
Stub_IVT_Extint::
    mov     r30=r3              // r30 = saved r3
    mov     r31=b0              // r31 = saved b0
    ;;
    movl    r3=NewHandler       // r3 = address for new handler
    ;;
    mov     b0=r3               // b0 = address for new handler
    ;;
    mov     r3=r30              // r3 = saved r3
    br.sptk.few b0              // branch to new handler
Stub_IVT_ExtinRet::
    mov     b0=r31              // b0 = saved b0
    ;;
Stub_IVT_ExtinOldBundle0::
    nop.m 0                     // First bundle of old handler inserted here.
    nop.i 0                     // Requires IP-relative fixup.
    nop.b 0
    ;;
Stub_IVT_ExtinBrOldBundle2::
    br.sptk.few Stub_IVT ExtintBrOldBundle2   // IP-relative dummy
                                              // branch. Requires IP-
                                              // relative fixup to
                                              // branch to second
                                              // bundle of old
                                              // handler.
```

The chained interrupt service routines may operate as follows. An interrupt may occur that causes the microprocessor to vector to the first location in entry 201, which may be specified by adding an offset value to the base value of the interrupt vector table. For example, the interrupt may be a timer interrupt that occurs and requires the execution of an interrupt service routine that updates the system clock. In the above example, existing interrupt service routine 220 has been chained to new interrupt service routine 380, which may be an interrupt that polls a certain hardware device. Because, according to an embodiment of the present invention, the first bundle in existing interrupt service routine 220 has been replaced by Branch to Chain Handler Module instruction 310, the vectoring to the first location in entry 201 causes the branching to and execution of the chain handler module 330 (instead of existing interrupt service routine 220).

The chain handler module may call the new interrupt service routine. It may begin by setting up the branch register to be used for the call of the new interrupt service routine. The first instruction in chain handler module may Save B0, which may save the branch register value to a temporary location. This value may be used upon return to the instruction that was executing prior to the interrupt. The next instructions may set up a branch to the new interrupt service routine 380 (Load B0 with New Interrupt Service Routine Instruction Address 332). The next instruction may branch to new interrupt service routine 380 (Branch B0 instruction 333). The instructions in the new interrupt service routine 380 are then executed. For example, it may poll a certain hardware device, which will now occur every time that the timer interrupt occurs.

The last instruction in the new interrupt service routine may be a relative branch back to the chain handler module, which may return control to the instruction following the Branch B0 instruction 333, that is, to the Restore B0 instruction 334. The Restore B0 instruction may restore the value of B0 that had been saved earlier in a temporary location by instruction 331. Thus, for example, instruction 334 may restore B0 to the value it had when existing interrupt service routine 220 was called. At the completion of the Restore B0, instructions of the existing interrupt service routine may be executed. In particular, the next instruction to be executed maybe the existing interrupt service routine 1$^{st}$ bundle 211, which has been moved to chain handler module 330 and has had any IP relative branches fixed up. Next, Relative Branch 336 may cause control to pass to the 2$^{nd}$ bundle 212 in entry 201, which is the second bundle in existing interrupt service routine 220. The rest of existing interrupt service routine 220 then may execute, and after it completes, may cause control to return to the point it was at when the interrupt occurred. Thus, using the example above, the timer interrupt will have caused the execution of the interrupt service routine that polls the certain hardware device as well as the execution of the interrupt service routine that updates the system clock. Other embodiments may use different instructions.

Figure 4:
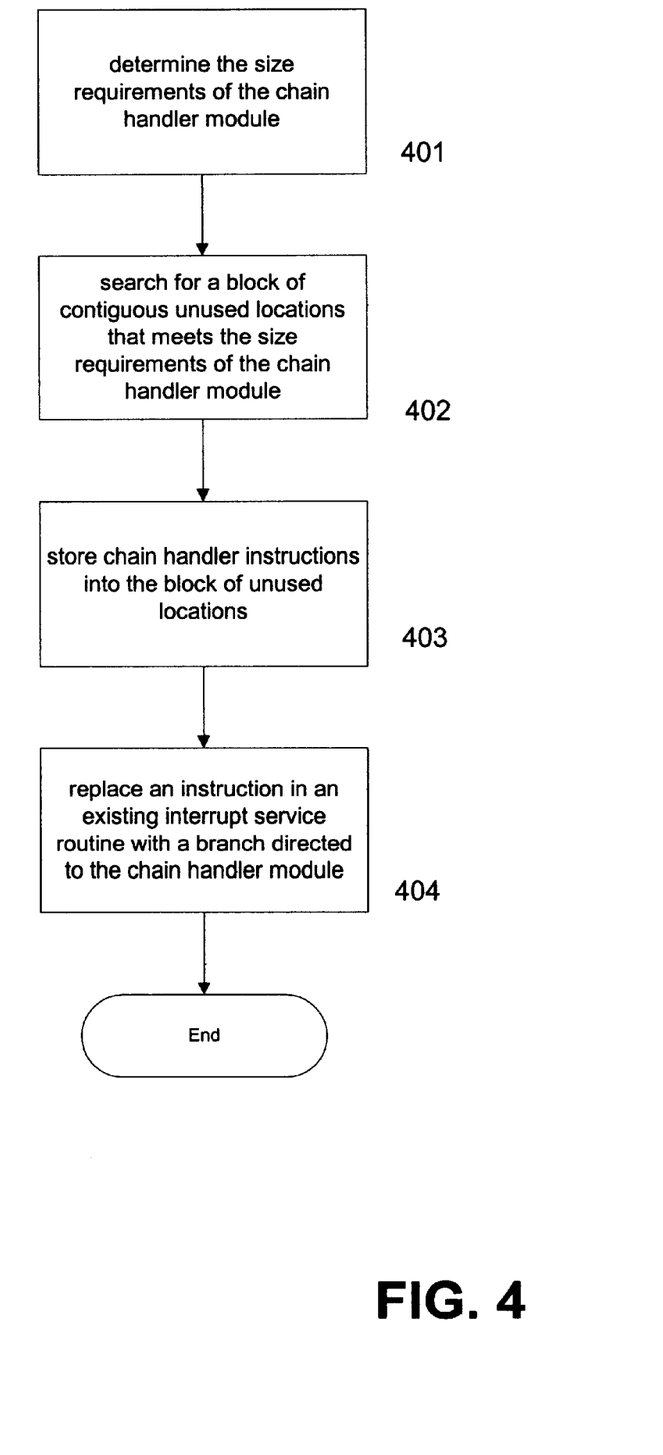
FIG. 4 is a flow diagram of a method of chaining interrupts according to one embodiment of the present invention.

FIG. 4 is a flow diagram of a method of chaining interrupts according to one embodiment of the present invention. In this embodiment, a chain handler module is stored. The chain handler module may be stored in an interrupt vector table, or it may be stored outside of the interrupt vector table. In one embodiment, the chain handler module is stored by locating a block of locations in an interrupt vector table and storing chain handler instructions into the block of locations. Locating a block of locations in the interrupt vector table may be accomplished by determining the size requirements of the chain handler module (401 if FIG. 4) and searching for a series of contiguous unused locations that meets the size requirements of, or fit, the chain handler (402). In the example shown in FIG. 3, the chain handler module requires six bundles. Other embodiments may require more or less bundles. One embodiment of a method of storing chain handler instructions into the block of unused locations (403) is shown in more detail in FIG. 5. The method of chaining interrupts shown in FIG. 4 also includes replacing an instruction in an existing interrupt service routine with a branch directed to the chain handler module (404). In one embodiment, the replacement of the instruction in an existing interrupt service routine is performed after the chain handler module has been stored. In a further embodiment, interrupts are turned off during the replacement of the instruction in the existing interrupt service routine so that the existing interrupt service routine will not be called while the replacement is taking place. In one embodiment, the first instruction in the existing interrupt service routine is replaced.

Figure 5:
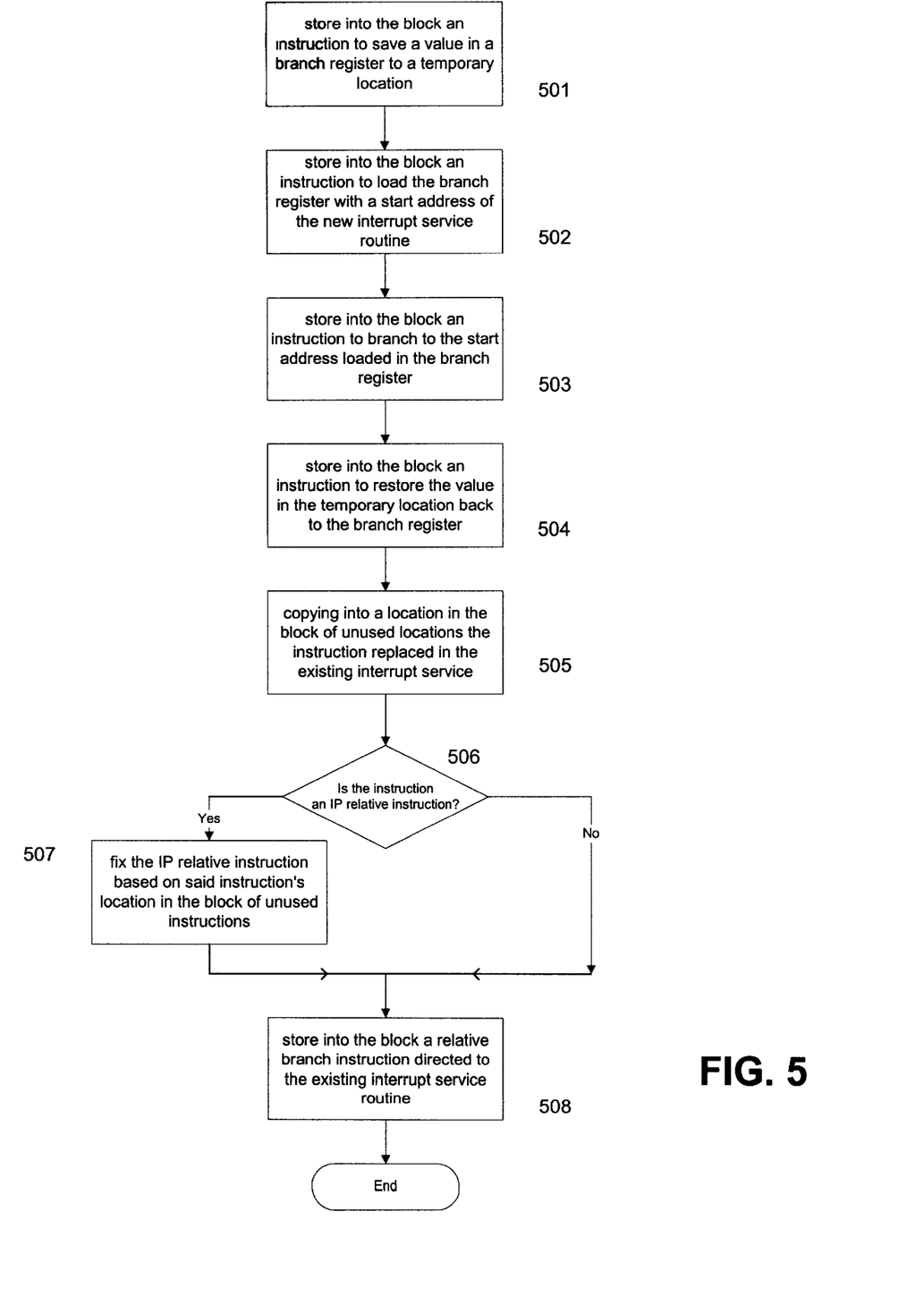
FIG. 5 is a flow diagram of a method of storing chain handler instructions into the block of unused locations according to one embodiment of the present invention.

FIG. 5 is a flow diagram of a method of storing chain handler instructions into the block of unused locations according to one embodiment of the present invention. In one embodiment, the chain handler instructions include instructions that call a new interrupt service routine. In this embodiment, storing chain handler instructions may include storing an instruction to save a value in a branch register to a temporary location (501). Storing chain handler instructions may also include storing an instruction to load the branch register with the start address of the new interrupt service routine (502). In addition, storing chain handler instructions may also include storing an instruction to branch to the address loaded in the branch register (503). Storing of chain handler instructions may also include storing an instruction to restore the value in the temporary location back to the branch register (504).

The method of storing chain handler instructions shown in FIG. 5 may also include copying into the block of unused locations the instruction replaced in the existing interrupt service routine (505). In addition, the method may also include determining whether the instruction replaced in the existing interrupt service routine is an instruction pointer relative instruction (506) and, if so, fixing the instruction pointer relative instruction based on the instruction's new location (507). The method of storing chain handler instructions shown in FIG. 5 may also include storing a relative branch instruction directed to the existing interrupt service routine (508). In one embodiment, the instruction replaced in the existing interrupt service routine is the first instruction bundle. In another embodiment, the relative branch instruction is directed to a second instruction in the existing interrupt service routine. In still another embodiment, a bundle of instructions are replaced in the existing interrupt service routine and copied into the block of unused locations.

Figure 6:
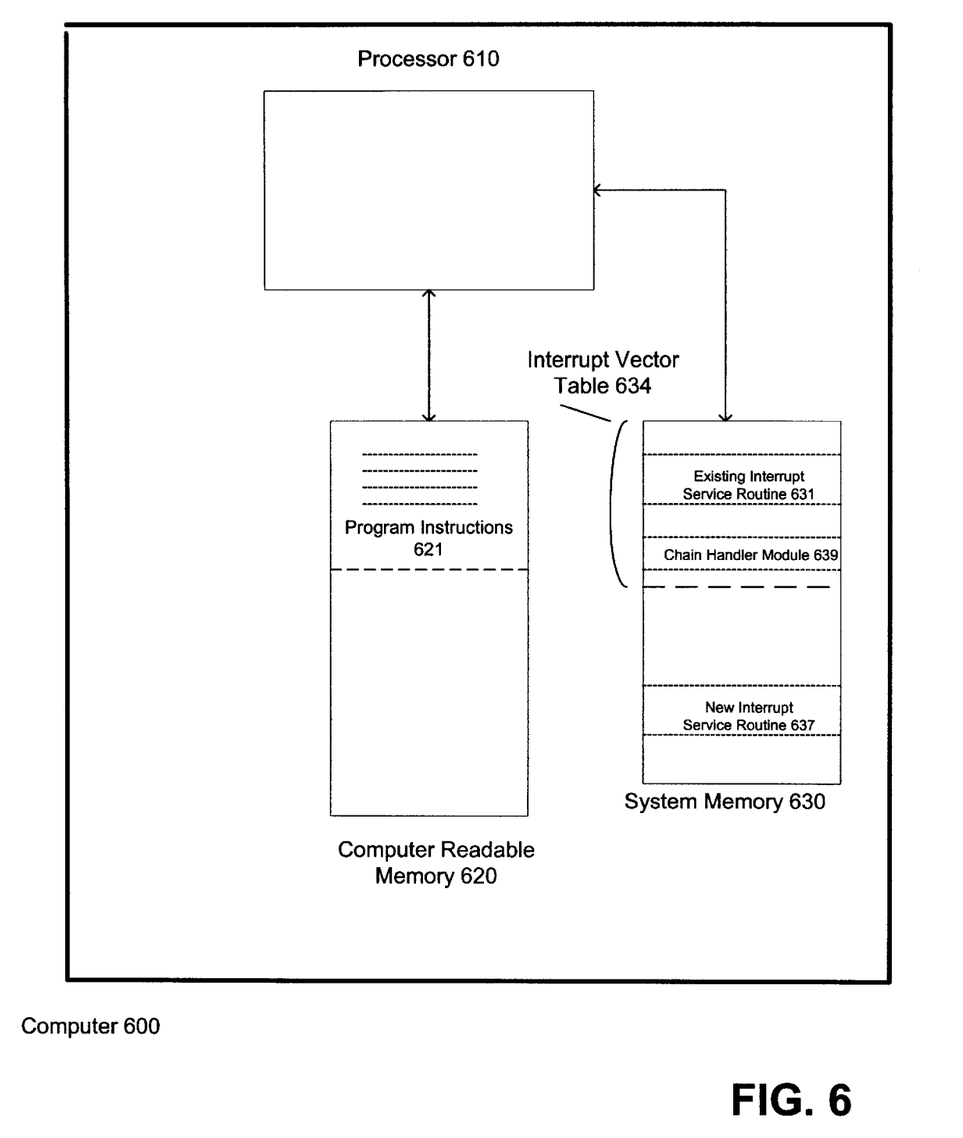
FIG. 6 is a partial block diagram of a computer with a computer readable memory that stores instructions adapted to be executed by a processor to perform a method of chaining interrupts according to one embodiment of the present invention.

FIG. 6 is a partial block diagram of a computer with a computer readable memory that stores instructions adapted to be executed by a processor to perform a method of chaining interrupts according to one embodiment of the present invention. Computer 600 comprises a processor 610, a computer readable memory 620, and a system memory 630. In other embodiments, computer 600 may also include other components such as an input device and an output device. Computer 600 may be a personal computer. Computer readable memory 620 may be any type of computer readable memory such as a floppy disk, a hard disk, a RAM, a CD-ROM, or a ROM. In other embodiments, computer readable memory 620 may exist outside of computer 600. For example, computer readable memory 620 may be a stand alone memory. System memory 630 may be any type of memory, and in one embodiment is a RAM. In a further embodiment, computer readable memory 620 and system memory 630 are the same memory. System memory 630 contains an interrupt vector table 631, which in turn contains an existing interrupt service routine 631. System memory 630 also contains a new interrupt service routine 637. Existing interrupt service routine 631 may be the same as the existing interrupt service routine 220 shown in FIGS. 2 and 3, and new interrupt service routine 637 may be the same as the new interrupt service routine 380 shown in FIG. 3. System memory 630 also contains a chain handler module 639, which may be the same as chain handler module 330. System memory 630 may also contain other data.

Computer readable memory 620 contains instructions 621 which may include program instructions 621 that, when executed by a processor, cause the processor to carry out the program. For example, program instructions 621 may cause the processor to carry out the methods for chaining interrupt service routines described herein and shown, for example, in FIGS. 4 and 5. The phrase "program instructions" is meant to encompass source code, assembler, and any other expression of instructions that may require preprocessing in order to be executed by processor. In one embodiment, the program instructions 621 are loaded into system memory 630 before being executed. Computer readable memory 620 may also contain other data.

In one embodiment, computer readable memory 620 may be a CD-ROM that contains a new device driver that is being loaded onto computer 600. As part of loading the new device driver onto computer 600, it may be necessary to chain a new interrupt service routine to an existing interrupt service routine. Computer readable memory 620 may contain program instructions 621 that, when executed by a processor, cause the processor chain existing interrupt service routine 631 to new interrupt service routine 637 according to an embodiment of the present invention.

The present invention provides a method and apparatus for chaining interrupt service routines. The present invention provides a mechanism that permits the new interrupt service routine to reside outside of the interrupt vector table even where the reach of IP relative branches is limited. The present invention is particularly advantageous in systems that have a fixed size interrupt vector table and do not have many empty bundles in the interrupt vector table.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, the present invention may be used to chain any type of new interrupt to any type of existing interrupt. An inter-processor interrupt is another example of a new interrupt that might be chained to an existing interrupt using the present invention. In addition, although the embodiment above chains a new interrupt service routine before an existing interrupt service routine, the new interrupt may also be chained after the existing interrupt service routine. Moreover, a series of interrupt service routines may be chained together. As another example, the instructions in the embodiment of the chain handler module shown above (e.g., Save B0, Load B0 with New Interrupt Service Routine Address, ext.) are only one set of possible instructions. In other embodiments, different instructions may be used and the order of the instructions may be varied. Similarly, the steps in the methods shown in FIGS. 4 and 5 may be varied.

I claim:

1. A method of chaining interrupt service routines, comprising:
    storing a chain handler module in an interrupt vector table, wherein the chain handler module comprises chain handler instructions to call a new interrupt service routine; and
    replacing an instruction in an existing interrupt service routine with a branch directed to the chain handler module, wherein the existing interrupt service routine is located in the interrupt vector table.

2. The method of claim 1, wherein storing a chain handler module in an interrupt vector table comprises:
    locating a block of locations in the interrupt vector table; and
    storing the chain handler instructions into the block of locations.

3. The method of claim 2, wherein locating a block of locations comprises:
    determining the size requirements of the chain handler module; and
    searching for a series of contiguous unused locations that meets the size requirements of the chain handler module.

4. The method of claim 1, wherein instructions to call the new interrupt service routine comprises:
    storing an instruction to save a value in a branch register to a temporary location;
    storing an instruction to load the branch register with a start address of the new interrupt service routine;
    storing an instruction to branch to the start address loaded in the branch register; and
    storing an instruction to restore the value in the temporary location back to the branch register.

5. The method of claim 1, wherein the chain handler instructions further comprise:
    copying to a location in a block of locations the instruction replaced in the existing interrupt service;
    determining whether the instruction replaced in the existing interrupt service routine is an instruction pointer relative instruction; and
    if the instruction replaced is an instruction pointer relative instruction, fixing the instruction pointer relative instruction based on the new location of the instruction replaced in the existing interrupt service.

6. The method of claim 5, wherein the chain handler instructions further comprise storing a relative branch instruction into the block of locations, wherein the relative branch instruction is directed to another instruction in the existing interrupt service routine.

7. The method of claim 6, wherein the instruction replaced is the first instruction in the existing interrupt service routine, and wherein the relative branch instruction is directed to the second instruction in the existing interrupt service routine.

8. The method of claim 1, wherein a bundle of instructions are replaced in the existing interrupt service routine.

9. A method of executing chained interrupt service routines, comprising:
    branching to a chain handler module;
    calling a new interrupt service routine from the chain handler module; and
    executing instructions of an existing interrupt service routine.

10. The method of claim 9, wherein the chain handler module is located within an interrupt vector table.

11. The method of claim 10, wherein calling the new interrupt service routine comprises:
    setting up a branch register;
    branching to the new interrupt service routine;
    executing instructions of the new interrupt service routine;
    branching back to the call handler module; and
    restoring the branch register.

12. The method of claim 11, wherein setting up a branch register comprises saving a value in the branch register to a temporary location and loading the branch register with the address of the new interrupt service routine, and wherein restoring the branch register comprises copying the value from the temporary location back to the branch register.

13. The method of claim 9, wherein executing instructions of an existing interrupt service routine comprises:
    executing a one instruction of the existing interrupt service routine within the chain handler module;
    branching to another instruction of the existing interrupt service routine; and
    executing said another instruction of the existing interrupt service routine.

14. A computer readable memory containing program instructions that, when executed by a processor, cause the processor to:
    store a chain handler module in an interrupt vector table, wherein the chain handler module comprises chain handler instructions to call a new interrupt service routine; and
    replace an instruction in an existing interrupt service routine with a branch directed to the chain handler module, wherein the existing interrupt service routine is located in the interrupt vector table.

15. The computer readable memory of claim 14, wherein said program instructions to store a chain handler module in an interrupt vector table include program instructions that cause the processor to:
    locate a block of locations in the interrupt vector table; and
    store the chain handler instructions into the block of locations.

16. The computer readable memory of claim 15, wherein said program instructions to locate a block of locations include program instructions that cause the processor to:
 determine the size requirements of the chain handler module; and
 search for a series of contiguous unused locations that meets the size requirements of the chain handler module.

17. The computer readable memory of claim 14, wherein the computer readable memory contains program instructions to call the new interrupt service routine by causing the processor to:
 store an instruction to save a value in a branch register to a temporary location;
 store an instruction to load the branch register with a start address of the new interrupt service routine;
 store an instruction to branch to the start address loaded in the branch register; and
 store an instruction to restore the value in the temporary location back to the branch register.

18. The computer readable memory of claim 14, wherein the computer readable memory also contains instructions that store the chain handler instructions into a block of unused instructions by causing the processor to:
 copy to a location in a block of locations the instruction replaced in the existing interrupt service;
 determine whether the instruction replaced in the existing interrupt service routine is an instruction pointer relative instruction; and
 if the instruction replaced is an instruction pointer relative instruction, fix the instruction pointer relative instruction based on the new location of the instruction replaced in the existing interrupt service.

19. The computer readable memory of claim 18, wherein the computer readable memory also contains instructions that store the chain handler instructions into the block of locations by causing the processor to store a relative branch instruction into the block of locations, wherein the relative branch instruction is directed to another instruction in the existing interrupt service routine.

20. The computer readable memory of claim 19, wherein the instruction replaced is the first instruction in the existing interrupt service routine, and wherein the relative branch instruction is directed to the second instruction in the existing interrupt service routine.

21. The computer readable memory of claim 14, wherein a bundle of instructions are replaced in the existing interrupt service routine.

22. A computer system, comprising:
 a processor; and
 a computer readable memory containing program instructions that, when executed by the processor, cause the processor to:
  branch to a chain handler module;
  call a new interrupt service routine from the chain handler module; and
  execute instructions of an existing interrupt service routine.

23. The computer system of claim 22, wherein the program instructions to call a new interrupt service routine comprises program instructions to:
 set up a branch register;
 branch to the new interrupt service routine;
 execute instructions of the new interrupt service routine;
 branch back to the chain handler module; and
 restore the branch register.

24. The computer system of claim 22, wherein the program instructions to set up a branch register comprise program instructions to save a value in the branch register to a temporary location and load the branch register with the address of the new interrupt service routine.

25. The computer system of claim 22, wherein the program instructions to execute instructions of an existing interrupt service routine comprise program instructions to:
 execute one instruction of the existing interrupt service routine within the chain handler module;
 branch to another instruction of the existing interrupt service routine; and
 execute said another instruction of the existing interrupt service routine.

* * * * *

UNITED STATES PATENT AND TRADEMARK OFFICE
CERTIFICATE OF CORRECTION

PATENT NO. : 6,618,779 B1
DATED : September 9, 2003
INVENTOR(S) : Branch It is certified that error appears in the above-identified patent and that said Letters Patent is hereby corrected as shown below:

Column 6,
Line 19, delete "Sub_IVT ExtintBrOldBundle2", insert
-- Sub_IVT_ExtintBrOldBundle2 --.

Signed and Sealed this

Twenty-fifth Day of May, 2004

JON W. DUDAS
*Acting Director of the United States Patent and Trademark Office*